(12) United States Patent
Catlin et al.

(10) Patent No.: US 10,406,438 B2
(45) Date of Patent: Sep. 10, 2019

(54) CONTROLLING BEHAVIOR OF ENTITIES IN FUNNEL SECTIONS OF A COMPUTER-REPRESENTED ENVIRONMENT

(71) Applicant: Microsoft Technology Licensing, LLC, Redmond, WA (US)

(72) Inventors: Scott C. Catlin, Bothell, WA (US); Jeffrey C. Schlimmer, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/663,611

(22) Filed: Jul. 28, 2017

(65) Prior Publication Data
US 2019/0030432 A1 Jan. 31, 2019

(51) Int. Cl.
*A63F 9/24* (2006.01)
*A63F 13/56* (2014.01)
(Continued)

(52) U.S. Cl.
CPC .............. *A63F 13/56* (2014.09); *A63F 13/35* (2014.09); *A63F 13/40* (2014.09); *A63F 13/50* (2014.09); *A63F 13/803* (2014.09); *A63F 13/67* (2014.09)

(58) Field of Classification Search
CPC ......... A63F 13/57; A63F 13/577; A63F 13/65
See application file for complete search history.

(56) References Cited

U.S. PATENT DOCUMENTS 6,199,030 B1 3/2001 Stone
6,385,529 B1 * 5/2002 Minowa ............. B60K 31/0008
701/300
(Continued)

FOREIGN PATENT DOCUMENTS

EP 1834679 9/2007

OTHER PUBLICATIONS

Chan et al., "Development of a Car Racing Simulator Game Using Artificial Intelligence Techniques," *Int'l Journal of Computer Games Technology*, vol. 2015, 5 pp. (Nov. 2015).
(Continued)

*Primary Examiner* — James S. McClellan
*Assistant Examiner* — Kevin M Carter
(74) *Attorney, Agent, or Firm* — Ray Quinney & Nebeker P.C.; Paul N. Taylor

(57) ABSTRACT

Innovations in the area of controlling behavior of computer-controlled entities such as cars in a computer-represented environment are presented herein. In various examples described herein, the behavior of computer-controlled cars is controlled by an artificial intelligence ("AI") behavior engine. The AI behavior engine performs operations to determine if the behavior (driving pattern, etc.) of a computer-controlled car should change for a funnel section. If so, the AI behavior engine switches the computer-controlled car to a trailing mode configuration and selects a candidate car to follow in the funnel section based on various criteria. The AI behavior engine also determines how to follow the candidate car by selecting a racing path and setting rules to determine the speed to use for following the candidate car. Control values are then set. The described innovations also generally apply to other racing scenarios, self-driving/autonomous cars, and other applications with robotic equipment and devices.

30 Claims, 10 Drawing Sheets

(51) Int. Cl.
  *A63F 13/803* (2014.01)
  *A63F 13/35* (2014.01)
  *A63F 13/50* (2014.01)
  *A63F 13/40* (2014.01)
  *A63F 13/67* (2014.01)

(56) References Cited

U.S. PATENT DOCUMENTS

| | | | |
|---|---|---|---|
| 6,733,383 B2 | 5/2004 | Busse et al. | |
| 7,090,576 B2 | 8/2006 | Herbrich et al. | |
| 7,358,973 B2 | 4/2008 | Herbrich et al. | |
| 7,837,543 B2 | 11/2010 | Graepel et al. | |
| 9,259,652 B2 | 2/2016 | Woodman et al. | |
| 9,495,874 B1* | 11/2016 | Zhu | G06N 20/00 |
| 9,805,601 B1* | 10/2017 | Fields | G08G 1/096791 |
| 9,940,840 B1* | 4/2018 | Schubert | G08G 1/22 |
| 2003/0033082 A1* | 2/2003 | Yanagidaira | G01C 21/26 701/431 |
| 2007/0066403 A1 | 3/2007 | Conkwright | |
| 2010/0256852 A1* | 10/2010 | Mudalige | G08G 1/163 701/24 |
| 2011/0256912 A1* | 10/2011 | Baynes | A63F 13/803 463/6 |
| 2015/0100216 A1* | 4/2015 | Rayes | B60W 30/143 701/96 |
| 2015/0166062 A1* | 6/2015 | Johnson | B60W 30/12 701/41 |
| 2016/0071418 A1* | 3/2016 | Oshida | G08G 1/22 701/23 |
| 2016/0311323 A1* | 10/2016 | Lee | B60K 37/06 |
| 2016/0378111 A1* | 12/2016 | Lenser | G05D 1/0251 701/2 |
| 2017/0200197 A1* | 7/2017 | Brubaker | G09F 9/35 |
| 2017/0312614 A1* | 11/2017 | Tran | G06F 1/163 |
| 2017/0318360 A1* | 11/2017 | Tran | G01L 5/0052 |
| 2018/0052458 A1* | 2/2018 | Tsuji | B60W 50/14 |
| 2018/0173231 A1* | 6/2018 | Takae | B60W 50/14 |

OTHER PUBLICATIONS

Foudil et al., "Path Finding and Collision Avoidance in Crowd Simulation," *Journal of Computing and Information Technology*, vol. 17, Issue 3, pp. 217-228 (Jan. 2009).

Fredriksen, "Middleware Solutions for Artificial Intelligence in Computer Games," *Electronic Publishing, Artistic Imaging, and Digital Typography*, vol. 3195, 91 pp. (Nov. 2003).

International Search Report and Written Opinion dated Aug. 29, 2018, from International Patent Application No. PCT/US2018/034968, 15 pp.

Reynolds, "Flocks, Herds, and Schools: A Distributed Behavioral Model," *Computer Graphics*, vol. 21, No. 4, pp. 25-34 (Jul. 1987).

Reynolds, "Steering Behaviors for Autonomous Characters," retrieved from: https://www.red3d.com/cwr/papers/1999/gdc99steer.pdf; 21 pp. (Jan. 1991).

Schnieders, "AIPATH: Movement Planning in Physically Constrained Domains," Master Thesis DKE 14-09, Maastricht University, 85 pp. (Jul. 2014).

van Waveren, "The Quake III Arena Bot," retrieved from: http://www.kbs.twi.tudelft.nl/docs/MSc/2001/Waveren_Jean-Paul_van/thesis.pdf, 118 pp. (Jun. 2001).

Wang et al., "An Effective Method of Pathfinding in a Car Racing Game," *Int'l Conf. on Computer and Automation Engineering*, pp. 544-547 (Feb. 2010).

Wang et al., "Game AI: Simulating Car Racing Game by Applying Pathfinding Algorithms," *Int'l Journal of Machine Learning and Computing*, vol. 2, Issue 1, pp. 13-18 (Feb. 2012).

\* cited by examiner

101

200

301

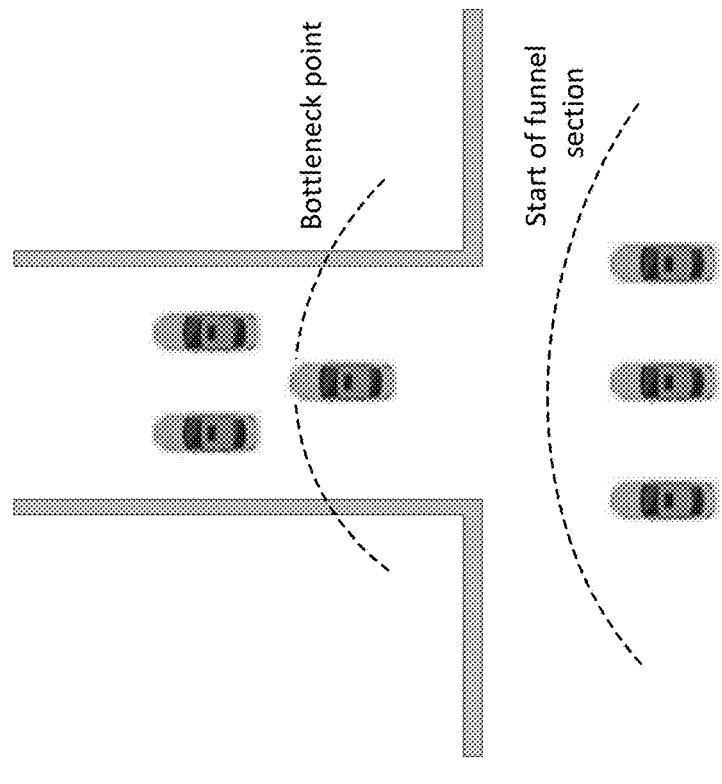
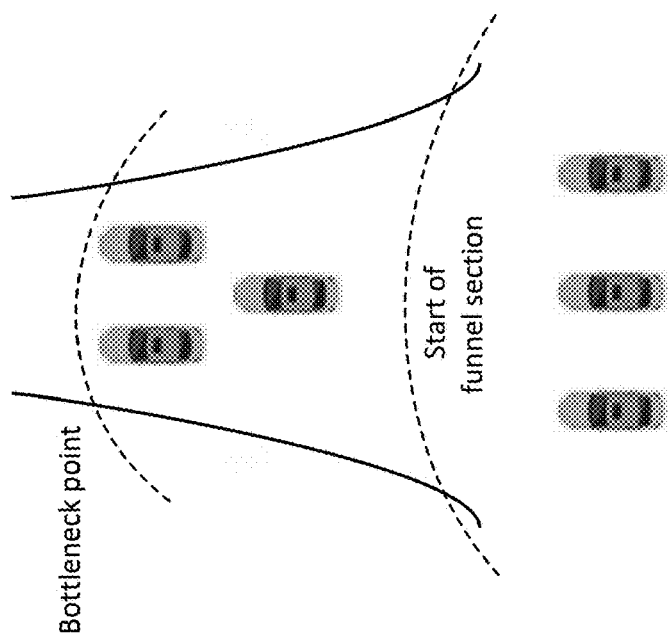
FIG. 3b
302

FIG. 4          400
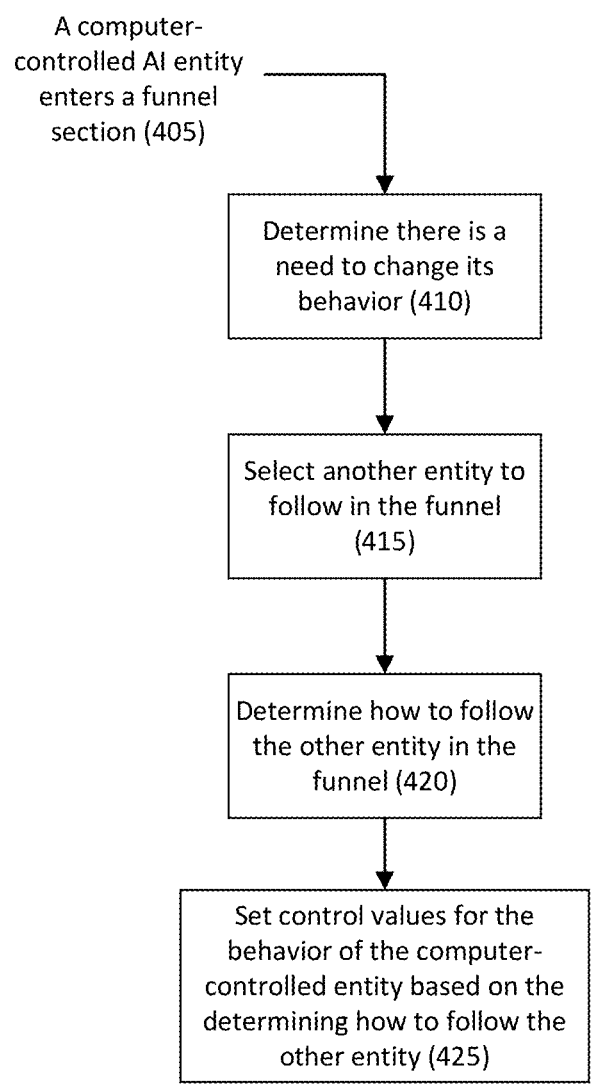

FIG. 6  600

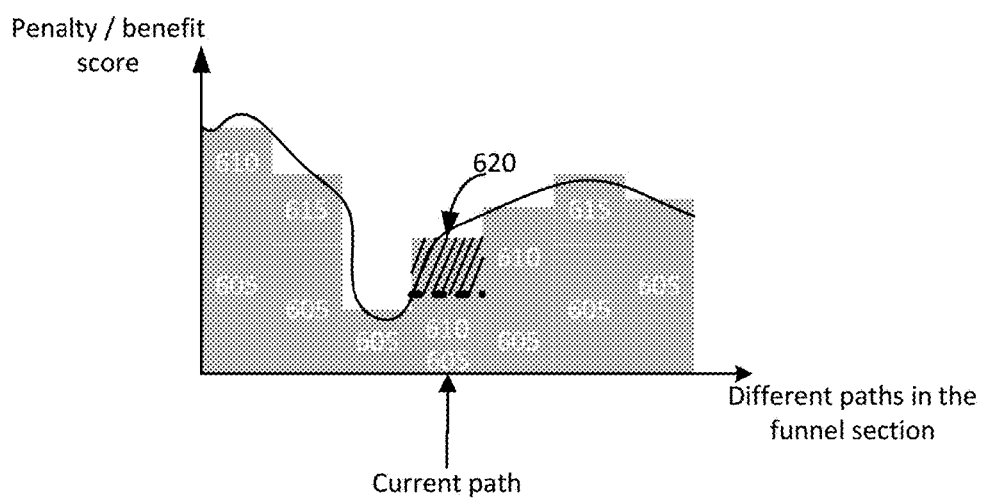

605. A penalty is added when the path deviates from the current path;
610. A penalty is added when there is an obstacle in front of the path;
615. A penalty is added when the candidate entity in the path has been followed by another computer-controlled AI entity.
620. A benefit is added to the current path if a candidate entity is in the current path and is linearly ahead of the given computer-controlled AI entity.

CONTROLLING BEHAVIOR OF ENTITIES IN FUNNEL SECTIONS OF A COMPUTER-REPRESENTED ENVIRONMENT

BACKGROUND

In racing games, a human player may race a car (user-controlled car) against other cars that are controlled by computer-implemented artificial intelligence (computer-controlled AI cars). The computer controls the cars according to predetermined rules, parameters and scenarios. In a local, single player gaming scenario, the goal of the human player is typically to beat the computer-controlled AI cars during the racing and set record times for the racing, but the goal can instead be defined in some other way, e.g., passing the most cars, having the fastest lap on a course, reaching the highest top speed, exhibiting the most drifting ability, etc. In a different gaming scenario, a human player may play car racing games not only against computer-controlled AI cars, but also against other user-controlled cars that are locally or remotely controlled by other human players. This is called multi-player racing and may dramatically increase the player's interest as it provides more realistic competition.

The goal for game designers to design a great racing game is to offer a human player a challenging and enjoyable experience against other (local or remote, online) human players as well as the computer-controlled AI cars. To achieve this goal, the designers try to provide the best user experience to the human player, which includes not only having the computer-controlled AI cars entertain and challenge the human player, but also maintaining a smooth racing experience at the same time.

In some car racing simulation games, collisions at the "first turn" of a race course present challenges to maintain a smooth racing experience for the human player. The first turn is an example of a bottleneck (choke point) at which "too many" cars should organize themselves to flow through a section that is "too narrow" to accommodate the cars in their current configuration. The first turn usually follows a start condition in which cars are arranged in a defined starting configuration (e.g., 2 cars across, row after row; or 3 cars across, row after row), and the cars are too closely spaced together to pass through the bottleneck at full speed or speeds approaching full speed. To navigate the first turn without collisions, cars are somehow reorganized into a configuration in which the cars travel at realistic speeds and patterns going into the first turn.

Handling first turn behavior for computer-controlled AI cars presents challenges in terms of accurately simulating human behavior in a computer-represented environment. A human player controlling a car may become irritated if involved in a collision during a racing game, especially a collision that the player did not cause. On the other hand, human players seek a realistic racing experience in which other players may exhibit aggressive and/or idiosyncratic behavior. Human players may become discouraged if the behavior of computer-controlled AI cars is too simplistic or passive to be considered realistic.

Some previous attempts to control the behavior of computer-controlled AI cars at the first turn of a race course have imposed simple rules to cause cars to organize in a "parade line" in an orderly fashion. While such an approach avoids collisions, the behavior of the computer-controlled AI cars is too orderly (ignoring the ad hoc nature of decisions by independent drivers) and cooperative (ignoring the advantages that real drivers would press to pass, move up, etc.) to be considered realistic.

Other previous attempts to control the behavior of computer-controlled AI cars at the first turn of a race course have imposed constraints on how cars with varying attributes are ordered at the start of a race. In particular, cars have been ordered in a starting configuration such that, due to different capabilities for acceleration at lower gears, the cars naturally separate from each other before the first turn. Although the behavior of individual computer-controlled AI cars may be more realistic in this approach, the constraint on ordering of cars by attributes is unrealistic. Moreover, for some race courses, the first turn may be too close to the starting line for the desired separation between cars to occur. And, in some racing scenarios, individual computer-controlled AI cars are constrained to have identical attributes.

Aside from the effects on player engagement, collisions at the first turn of a race course can strain computational resources of a gaming console, desktop computer, or other computer systems. Rendering crash details for cars involved in a collision, while rendering other details for the large number of cars at the start of a race, can force the computer system to decrease the level of detail in terms of graphical detail or frame rate, or if that is not done cause playback that is "glitchy" or "laggy." As such, avoiding collisions at the first turn of a race course can reduce computational resources used for rendering at that stage and/or improve the quality of rendering.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description presents ways and operations for a computer to control the behavior of computer-controlled AI entities (e.g., cars) in a racing game or other scenario. For example, in the context of a car racing game, the approaches presented herein can reduce the likelihood of collisions at a first turn of a racing course at the start of a race, thus enhancing the user experience of human players who do not like to see frequent collisions in a racing game. Besides the first turn of a racing course, the described innovations can also be applied to other bottleneck points in a racing course. For example, more generally, the described innovations can be applied when there are too many entities (e.g., cars) in a designated section and it is impossible for all the entities to flow through a bottleneck point at full speed or without changing their driving pattern. The described innovations can also be applied to various scenarios other than car racing, which may include motorcycle racing, bicycle racing, boat racing, ski racing, self-driving cars, and other applications with robotic equipment and devices.

In various examples described herein, the behavior of a computer-controlled AI car in a computer racing game is controlled by an AI behavior engine of a gaming system. In other examples described herein, the behavior of another type of computer-controlled AI entity is controlled by an AI behavior engine of a computer system. For example, the AI behavior engine can perform operations to determine if it is necessary to change the behavior (e.g., operational mode, path, driving pattern, speed, etc.) of the computer-controlled AI entity for a funnel section in the computer-represented environment. Upon the decision to change the behavior, the AI behavior engine can selectively switch the computer-controlled AI entity to a "trailing mode" configuration and select a candidate entity for the computer-controlled AI entity to follow in the funnel section based on various criteria. The AI behavior engine can also determine how the computer-controlled AI entity will follow the candidate entity in the funnel section by selecting a moving path for the given computer-controlled AI entity as well as applying rules to determine the speed to use for following the candidate entity. The AI behavior engine can also perform operations to set control values for the behavior of the given computer-controlled AI entity based on the results of the determining how to follow the candidate entity. The AI behavior engine can control the behavior of computer-controlled AI entities based at least in part on settings (thresholds, weights, preferences, rules, etc.). One or more of the settings can be predefined. Instead of or in addition to such predefined setting(s), one or more of the settings can be learned from user behavior and/or trial-and-error evaluation during operation.

The innovations can be implemented as part of a method, as part of a computer system configured to perform the method or as part of a tangible computer-readable media storing computer-executable instructions for causing a computer system, when programmed thereby, to perform the method. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIGS. 3a, 3b, 3c and 3d are diagrams illustrating example funnel sections.

FIG. 4 is a diagram illustrating an example approach for controlling the behavior of a computer-controlled AI entity (e.g., car) in a funnel section.

FIG. 6 is a diagram illustrating an example of how an AI behavior engine uses a scoring function to assign a score values to different candidate entities and selects one of the candidate entities for the computer-controlled AI entity to follow.

DETAILED DESCRIPTION

The detailed description presents innovations for a computer to control the behavior of computer-controlled AI cars in a racing game or other scenario. For example, the described innovations can be used to reduce collisions at a first turn of a racing course at the start of a race, or at another bottleneck in the racing course, thus enhancing the user experience of human players who do not like to see frequent collisions in racing games. The described innovations can also be applied to entities other than cars, in various scenarios other than car racing, which may include motorcycle racing, bicycle racing, boat racing, ski racing, self-driving cars, and other applications with robotic equipment and devices.

In some example implementations, the described innovations can provide various benefits in terms of user experience and operating efficiency of a gaming system and/or gaming server. For example, the described innovations can facilitate computationally tractable control of the behavior of computer-controlled AI entities while providing realistic results and simulating the emergent behavior of complex systems of independent entities in a realistic way. Such computationally tractable control of behavior can help avoid computationally-intensive events (e.g., for collisions). For scenarios in which updates (describing behavior of computer-controlled AI entities) are shared, the described innovations can be used to split the computational load of determining decisions about the behavior of the computer-controlled AI entities.

Although operations described herein are in places described as being performed by a gaming console or other gaming device, in many cases the operations can be performed by another type of computing device (e.g., smartphone, tablet computer, personal computer, special-purpose control unit for a car or robotic system). More generally, various alternatives to the examples described herein are possible. For example, certain techniques described with reference to flowchart diagrams can be altered by changing the ordering of stages shown in the flowcharts, by splitting, repeating or omitting certain stages, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Operating Environments.

Figure 1A:
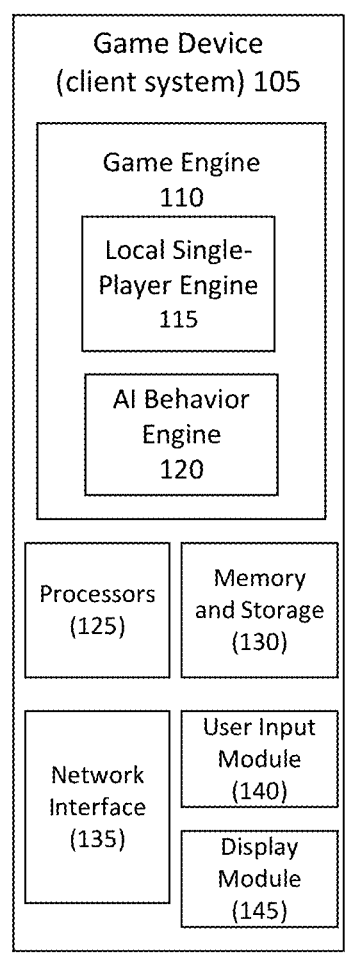
FIGS. 1a and 1b are diagrams illustrating an example local single-player gaming system and an example multi-player gaming system, respectively, in which some described embodiments can be implemented.
Figure 1B:
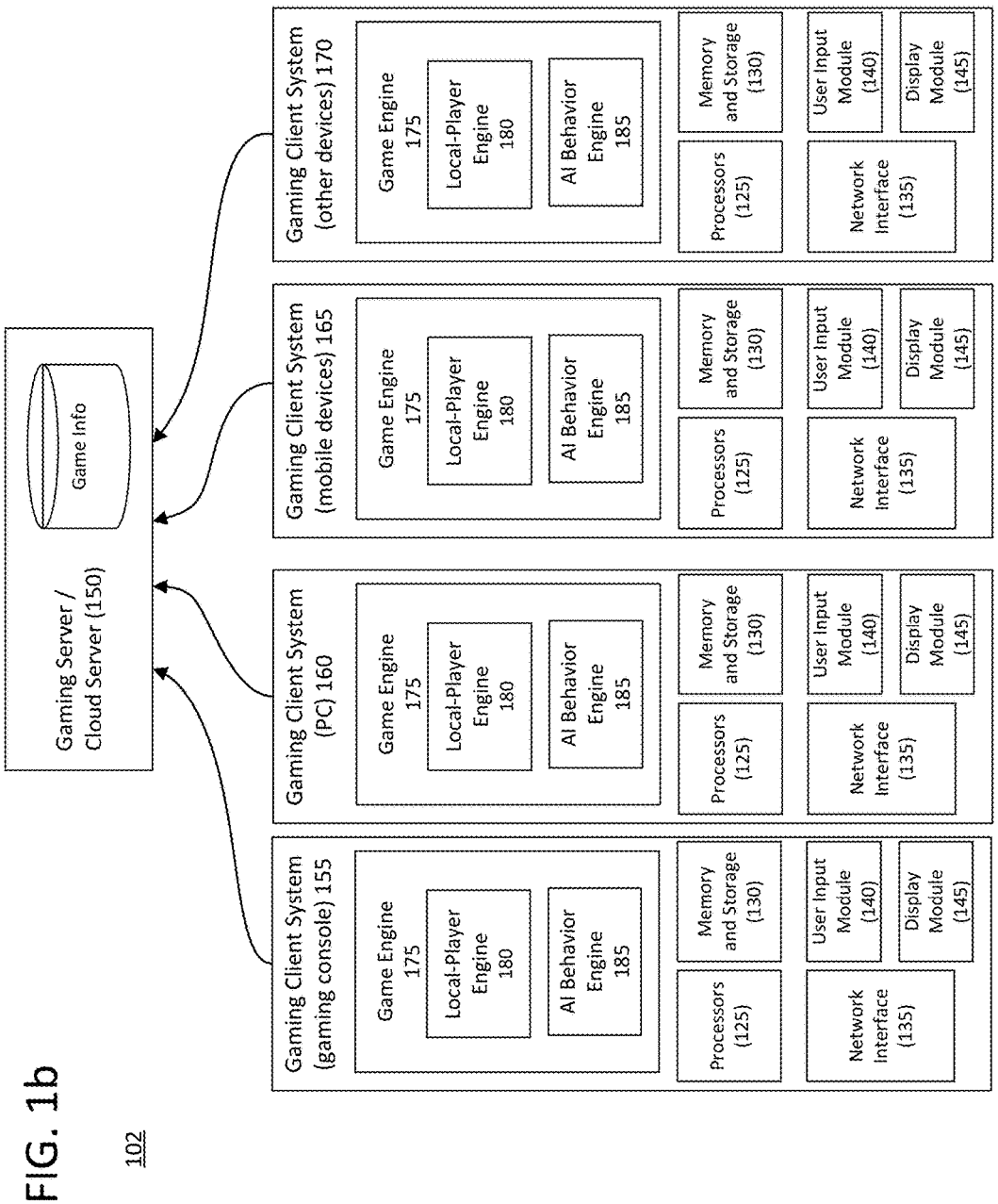

FIGS. 1a and 1b illustrate generalized examples of suitable gaming systems in which the described innovations may be implemented. The gaming systems are not intended to suggest any limitation as to scope of use or functionality, as the innovations may be implemented in diverse general-purpose or special-purpose gaming systems, or other computer systems.

A. Example Game Systems.

With reference to FIG. 1a, the gaming system (101) has only one gaming client system (105), which is used for local play scenarios, where a human player races against computer-controlled AI cars locally. The gaming system (101) includes a game engine (110), which further includes a local single-player engine (115) configured to control the user-controlled car and an AI behavior engine (120) configured to control computer-controlled AI cars. Examples of operations performed by the AI behavior engine (120) are described in sections below. The game engine (110) also includes components (not shown) for processing user input events (conveyed from one or more user input processing modules (140)), applying game-specific rules, and rendering visual output and audio output for gameplay.

The client gaming system (105) also includes one or more processors (125) (or "processing units"), which are configured to process user input, apply game-specific rules, render output, etc., and which implement the local single-player engine (115) and the AI behavior engine (120). A processing unit can be a central processing unit ("CPU") that executes computer-executable instructions, a graphics processing unit ("GPU") that executes computer-executable instructions (such as shader instructions), a processor in an applicationspecific integrated circuit ("ASIC") or any other type of processor. The processing unit(s) can be part of a system-on-a-chip ("SoC").

The client gaming system (105) includes memory and storage (130). The memory/storage (130) may be volatile memory (e.g., registers, cache, RAM), non-volatile memory (e.g., ROM, EEPROM, flash memory, etc.), or some combination of the two, accessible by the processor(s) (125). The memory/storage (130) may be removable or non-removable, and includes magnetic disk media, optical disk media and/or any other media which can be used to store information and which can be accessed within the client gaming system (105). The memory/storage (130) stores software implementing one or more innovations described herein, in the form of computer-executable instructions. In some example implementations, computer-executable instructions for the AI behavior engine (120) are executable on one or more CPUs.

The client gaming system (105) may include one or more network interface devices (135). The network interface device(s) (135) enable communication over a network to another computing entity (e.g., server, other gaming console). The network interface device(s) (135) can support wired connections and/or wireless connections, for a wide-area network, local-area network, personal-area network or other network. For example, the network interface device(s) can include one or more Wi-Fi transceivers, an Ethernet port, a cellular transceiver and/or another type of network interface device, along with associated drivers, software, etc. The network interface device(s) (135) convey information such as computer-executable instructions, audio or video input or output, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier. In networked gaming configurations (see below), the network interface device(s) (135) can convey updates that indicate the behavior and/or control values for computer-controlled AI cars or user-controlled cars, as well as other gaming information.

The client gaming system (105) includes one or more user input processing modules (140). For example, a game controller input processing module accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller. The client gaming system (105) optionally includes one or more motion sensors/trackers, in which case a sensor/tracker input module processes inputs to track the movements of a user and/or objects around the user. For example, the motion sensor/tracker component(s) allow a user (e.g., player of the game) to interact with the client gaming system (105) through a natural user interface using gestures and spoken commands. The motion sensor/tracker component(s) can incorporate gesture recognition, facial recognition and voice recognition, or they can incorporate tracking of fixed points on the user or one or more game controllers. Other input device(s) may include a touch input device such as a keyboard, mouse, pen, or trackball, a scanning device, or another device that provides input to the client gaming system (105).

The client gaming system (105) further includes a display processing module (145), which processes video output to a display device (not shown). The video output can be an HDMI output or other type of output.

The client gaming system (105) may have various other components (not shown), such as a video input that can accept input video in analog or digital form, a camera input, an audio input (e.g., from a microphone), and/or an audio output (e.g., to speakers).

In this local play configuration, the client gaming system (105) controls the behavior of all computer-controlled AI cars through the AI behavior engine (120) on the local client system (105). In contrast, in other configurations, the behavior of at least some computer-controlled AI cars may be controlled by a gaming/cloud server and/or remote gaming systems.

An interconnection mechanism (not shown) such as a bus, controller, or network interconnects the components of the client gaming system (105). Typically, operating system software (not shown) provides an operating environment for other software executing in the client gaming system (105), and coordinates activities of the components of the client gaming system (105).

With reference to FIG. 1b, the gaming system (102) has multiple client systems (155, 160, 165, 170), which are used for multi-player, online play. A gaming server/cloud server (150) is used to collect game information from each of the client systems (155, 160, 165, 170), and then push updates to all of them. The server (150) can be a dedicated gaming server, or the server can be a cloud server acting as a gaming server. Typically, the server (150) includes one or more processors (e.g., like the processor(s) (125) described with reference to FIG. 1a) as well as memory and/or storage (e.g., like the memory/storage (130) described with reference to FIG. 1a). In some example implementations, computer-executable instructions for the server (150) are executable on one or more CPUs. The server (150) includes one or more network interface devices (135), as described with reference to FIG. 1a. The network interface device(s) convey updates that indicate the behavior and/or control values for computer-controlled AI cars or user-controlled cars between client systems (155, 160, 165, 170), as well as other game information. The server (150) can also include input processing modules, display processing modules, and other components. An interconnection mechanism (not shown) such as a bus, controller, or network interconnects the components of the server (150). Typically, operating system software (not shown) provides an operating environment for other software executing in the server (150), and coordinates activities of the components of the server (150).

In some configurations, instead of or in addition to collecting and conveying updates to client systems (155, 160, 165, 170), the server (150) itself includes an AI behavior engine that is configured to control the behavior of at least some computer-controlled AI cars. In this case, after setting control values for the behavior of the cars it controls, the server (150) can push updates about the cars it controls to the client systems (155, 160, 165, 170).

In practice, a multi-player, online gaming session can include one or more types of client systems or devices from the players. For example, in FIG. 1b, the client systems or devices include a gaming console (155), desktop computer system (personal computer) (160), a mobile device (165), and another type of device (170). Alternatively, an online gaming session can include some other combination of these different categories of devices. In practice, all players in a multi-player, online gaming session may be constrained to use one type of device (e.g., each player has gaming console, or each player has desktop computer). Given differences in input modes (and availability of modifications, etc.) for different platforms, this can provide a better user experience.

For each of the client systems (155, 160, 165, 170), the system includes a game engine (175), which further includes a local-player engine (180) configured to control the local user-controlled car and an AI behavior engine (185) configured to control computer-controlled AI cars. Examples of operations performed by the AI behavior engine (185) are described in sections below. In addition to including components (not shown) for processing user input events (conveyed from one or more user input processing modules (140)), applying game-specific rules, and rendering visual output and audio output for gameplay, the game engine (175) includes components for exchanging updates to/from the server (150) regarding behavior of computer-controlled AI cars and user-controlled cars, as well as other game information.

Each of the gaming client systems (155, 160, 165, 170) also includes one or more processors, which implement the local-player engine (180) and the AI behavior engine (185). As described with reference to FIG. 1*a*, the processor(s) are configured to process user input, apply game-specific rules, and render output. The processor(s) are further configured to send update information to the gaming/cloud server (150) and receive updates from the gaming/cloud server (150). In doing so, the processor(s) react to the updates and instructions from the server (150). Each of the gaming client systems (155, 160, 165, 170) also includes memory and storage (130), one or more network interface devices (135), one or more user input processing modules (140), and a display processing module (145), as described with reference to FIG. 1*a*. The client gaming system (155, 160, 165, 170) may have various other components (not shown), such as a video input, a camera input, an audio input (e.g., from a microphone), and/or an audio output (e.g., to speakers).

The innovations can be described in the general context of computer-readable media. Computer-readable media are tangible media that can be accessed within a computing environment. By way of example, and not limitation, within the client gaming systems (105, 155, 160, 165, 170) or server (150), computer-readable media include memory/storage (130). As used herein, the term computer-readable media does not encompass any transitory signal or propagating carrier wave.

The innovations can be described in the general context of computer-executable instructions, such as those included in program modules, being executed in a computing system on a target real or virtual processor. Generally, program modules (also called modules, engines, or components) include routines, programs, libraries, objects, classes, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or hardware with software implementing the functionality described herein.

For the sake of presentation, the detailed description uses terms like "determine," "select" and "set" to describe computer operations in a computing system. These terms denote operations performed by a computer, and should not be confused with acts performed by a human being. The actual computer operations corresponding to these terms vary depending on implementation.

B. Example Gaming Configurations.

When a game is in a local play scenario with a single gaming client system, the local gaming client system can control the behavior of all computer-controlled AI cars through the local AI behavior engine. No updates from the gaming client system are shared to the network (to a gaming/cloud server or remote gaming client systems) in this configuration, and no updates are received from the network (from a gaming/cloud server or remote gaming client systems) in this configuration.

Figure 2:
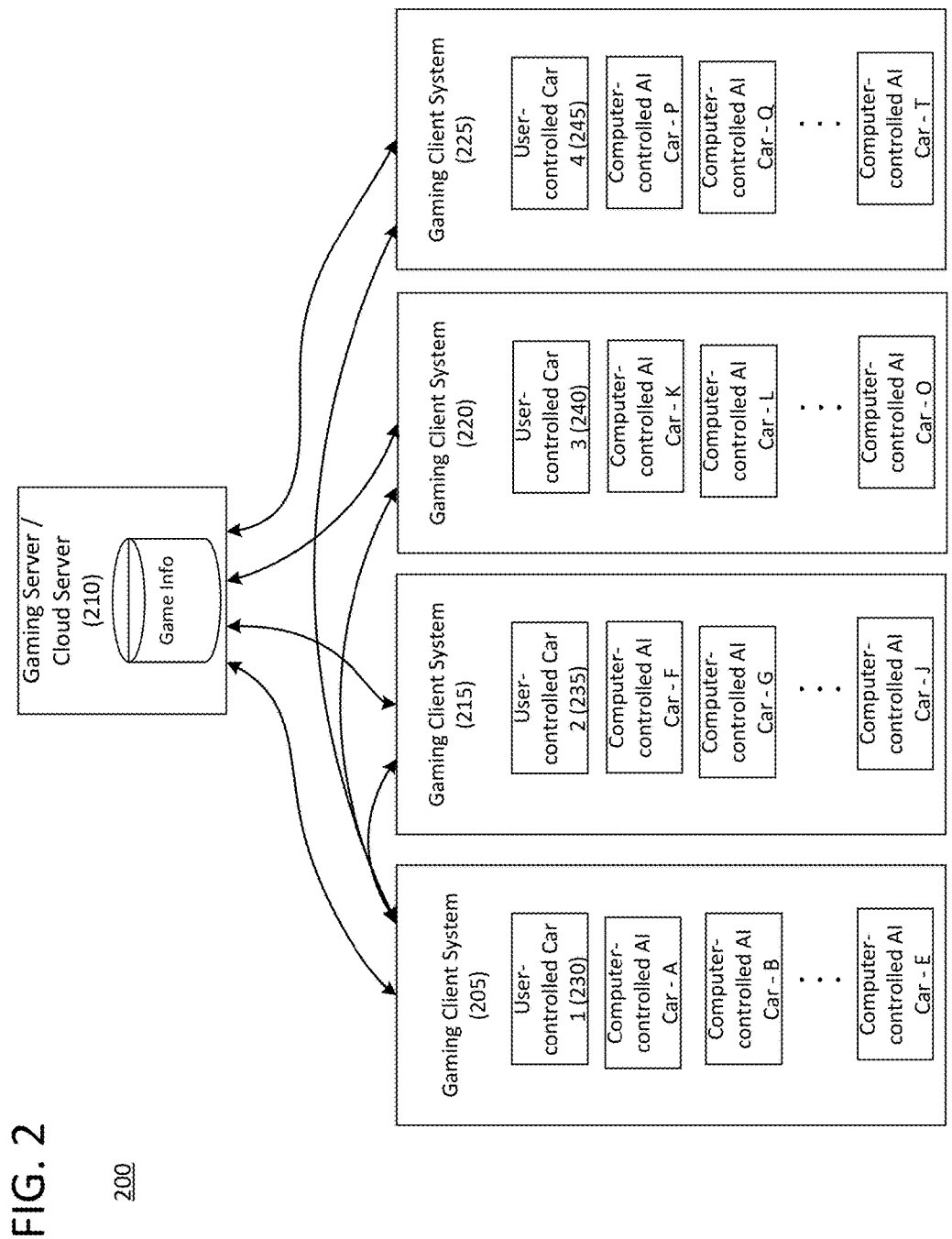
FIG. 2 is a diagram illustrating an example gaming configuration in a computer network system.

In contrast, FIG. 2 illustrates an example configuration for an online, multi-player racing game. In this configuration, the AI behavior engine (185) executing at a given client system (205, 215, 220, or 225) controls the behavior of one or more computer-controlled AI cars (e.g., the cars closest to the user-controlled car at that client system, or some random selection of the computer-controlled AI cars). The given client system (e.g., 205) shares to the server (210) (or directly to other client systems (e.g., 215, 220, 225, as shown in FIG. 2), through one or more network interface devices (135), the updates that indicate the behavior of both the computer-controlled AI cars that it controls as well as the user-controlled car at the given client system. For other computer-controlled AI cars not controlled at the given client system (e.g., 205), the given client system can predict their behavior in order to have a "rough estimate" for those computer-controlled AI cars. The given client system (e.g., 205) also receives updates from the server (210) or directly from other client systems (e.g., 215, 220, 225, as shown in FIG. 2) that indicate the actual behavior of the other computer-controlled AI cars (which the given client system does not control) and the other user-controlled cars. The given client system incorporates the updates into the local rendering experience, which may cause an adjustment to the position, orientation, vector, and/or other behavior, of a computer-controlled AI car or any other user-controlled car that is away from its prediction.

The server (210) collects information about the behavior of the respective user-controlled cars (230, 235, 240, 245) from each of the client systems (205, 215, 220, 225). It then pushes gaming information updates to all the client systems (205, 215, 220, 225). The gaming information updates include the behavior updates for both user-controlled cars (230, 235, 240, 245) and the computer-controlled AI cars.

In the example (200) of FIG. 2, a configuration includes four gaming client systems (205, 215, 220, and 225) and a gaming server/cloud server (210), which implements a packet service. Each of the gaming client systems (205, 215, 220, and 225) manages behavior of one human player (responsive to user input), to manage one of the user-controlled cars (230, 235, 240 and 245), and controls behavior of five AI cars. Therefore, there are a total of 24 user-controlled and computer-controlled AI cars in the racing game.

Client system 1 (205) manages/controls the car of human player 1 and AI cars A-E. For managing behavior at a bottleneck, client system 1 (205) controls the behavior of AI cars A-E by performing operations with an AI behavior engine (185) on client system 1 (205). Client system 1 (205) sends updates that indicate the behavior of AI cars A-E, as computed on client system 1 (205), to the server (210) for distribution to client systems 2-4 (215, 220, 225). Client system 1 (205) estimates (generally predicts) the behavior of AI cars F-T with locally performed operations on client system 1. Client system 1 (205) may also provide some "assists" to human player 1. (An "assist" is a steering correction or other control correction to avoid a collision. An assist is typically "gentle"/not noticeable by the human player.) Client system 1 (205) receives updates (from other client systems (215, 220, 225) through the server (210)) that indicate the actual behavior of AI cars F-T, as set by other client systems (215, 220, 225). Client system 1 (205) can process (e.g., in its AI behavior engine (185)) those updates to adjust the positions, behavior, etc. of AI cars F-T on client system 1 (205), which can involve correcting estimates of the positions, behavior, etc. of AI cars F-T.

Client system 2 (215) manages/controls the car of human player 2 and AI cars F-J. For managing behavior at a bottleneck, client system 2 (215) controls the behavior of AI cars F-J by performing operations with an AI behavior engine (185) on client system 2 (215). Client system 2 (215) sends updates that indicate the behavior of AI cars F-J, as computed on client system 2 (215), to the server (210), for distribution to client systems 1, 3, and 4 (205, 220, 225). Client system 2 (215) estimates (generally predicts) the behavior of AI cars A-E and K-T with locally performed operations on client system 2 (215). Client system 2 (215) receives updates (from other client systems (205, 220, 225) through the server (210)) that indicate the actual behavior of AI cars A-E and K-T, as set by other client systems (205, 220, 225). Client system 2 (215) can process those updates (e.g., in its AI behavior engine (185)) to adjust the positions, behavior, etc. of AI cars A-E and K-T on client system 2 (215), which can involve correcting estimates of the positions, behavior, etc. of AI cars A-E and F-T. Client system 2 (215) may also provide some "assists" to human player 2.

Client system 3 (220) manages/controls the car of human player 3 and AI cars K-O. For managing behavior at a bottleneck, client system 3 (220) controls the behavior of AI cars K-O by performing operations with an AI behavior engine (185) on client system 3 (220). Client system 3 (220) sends updates that indicate the behavior of AI cars K-O, as computed on client system 3 (220), to the server (210), for distribution to client systems 1, 2, and 4 (205, 215, 225). Client system 3 (220) estimates (generally predicts) the behavior of AI cars A-J and P-T with locally performed operations on client system 3 (220). Client system 3 (220) receives updates (from other client systems (205, 215, 225) through the server (210)) that indicate the actual behavior of AI cars A-J and P-T, as set by other client systems (205, 215, 225). Client system 3 (220) can process those updates (e.g., in its AI behavior engine (185)) to adjust the positions, behavior, etc. of AI cars A-J and P-T on client system 3 (220), which can involve correcting estimates of the positions, behavior, etc. of AI cars A-J and P-T. Client system 3 (220) may also provide some "assists" to human player 3.

Client system 4 (225) manages/controls the car of human player 4 and AI cars P-T. For managing behavior at a bottleneck, client system 4 (225) controls the behavior of AI cars P-T by performing operations with an AI behavior engine (185) on client system 4 (225). Client system 4 (225) sends updates that indicate the behavior of AI cars P-T, as computed on client system 4 (225), to the server (210), for distribution to client systems 1-3 (205, 215, 220). Client system 4 (225) estimates (generally predicts) the behavior of AI cars A-O with locally performed operations on client system 4 (225). Client system 4 (225) receives updates (from other client systems (205, 215, 220) through the server (210)) that indicate the actual behavior of AI cars A-O, as set by other client systems (205, 215, 220). Client system 4 (225) can process those updates (e.g., in its AI behavior engine (185)) to adjust the positions, behavior, etc. of AI cars A-O on client system 4 (225), which can involve correcting estimates of the positions, behavior, etc. of AI cars A-O. Client system 4 (225) may also provide some "assists" to human player 4.

In a different configuration, the gaming/cloud server (210) is used to control the behavior of some or all of the computer-controlled AI cars. Also, if one of the client systems (205, 215, 220, or 225) is slow or non-responsive, updates from that client system can be disabled. The computer-controlled AI cars assigned to that client system can be re-assigned to the gaming/cloud server (210) or to one or more other client systems, for controlling the behavior of the computer-controlled AI cars. Or, a given client system can switch to a "local only" mode for controlling the behavior of computer-controlled AI cars.

For all configurations, more generally, the server (210) can provide settings (e.g., for the AI behavior engine) and updates to client systems (205, 215, 220, 225) at the start of a race or at various times during the race. Settings/updates can be delivered by a sender periodically according to a "push" model. Alternatively, settings/updates can be delivered on demand, in response to polling or other queries by a receiver, according to a "pull model."

For all configurations, the way that behavior at a first turn or other bottleneck is controlled can vary in terms of level of detail ("LOD"). LOD variation can depend on proximity of computer-controlled AI entities to user-controlled entities (e.g., higher LOD for a computer-controlled AI entity closer to a user-controlled entity; lower LOD for a computer-controlled AI entity further from a user-controlled entity). LOD variation can affect the frequency of updates (e.g., more frequent updates for any computer-controlled AI entity near a user-controlled entity; less frequent updates for any computer-controlled AI entity further from any user-controlled entity), the precision of updates (e.g., more detailed updates for any computer-controlled AI entity near a user-controlled entity; less detailed updates for any computer-controlled AI entity further from any user-controlled entity), and/or how decisions are made/updates are incorporated with an AI behavior engine (180) (e.g., more sophisticated control for any computer-controlled AI entity near a user-controlled entity of a local player; less sophisticated control for any other computer-controlled AI entity).

II. Example Funnel Sections.

FIGS. 3a, 3b, 3c and 3d show some examples (301-304) of bottlenecks and funnel sections. These examples illustrate some common situations in which the techniques described herein can be applied, but the techniques described herein can also be applied in other situations. In general, a funnel section is a designated section ahead of a bottleneck.

In some example implementations, a race course can be annotated (e.g., by a gaming engine (110/175) or otherwise) to designate one or more funnel sections in which the behavior of computer-controlled AI entities (e.g., cars) changes ahead of bottleneck points. A funnel section can be designated, for example, by indicating the start and end of the funnel section, the start of the funnel section and location of a bottleneck point, the location of a bottleneck point and a distance ahead of it, or an attribute for a region of the course. The end of a funnel section can overlap the beginning of a bottleneck. In general, a funnel section starts at a point when the AI behavior engine (120/185) begins to evaluate whether to change behavior of computer-controlled AI entities (e.g., cars) before a bottleneck point.

Figure 3A:
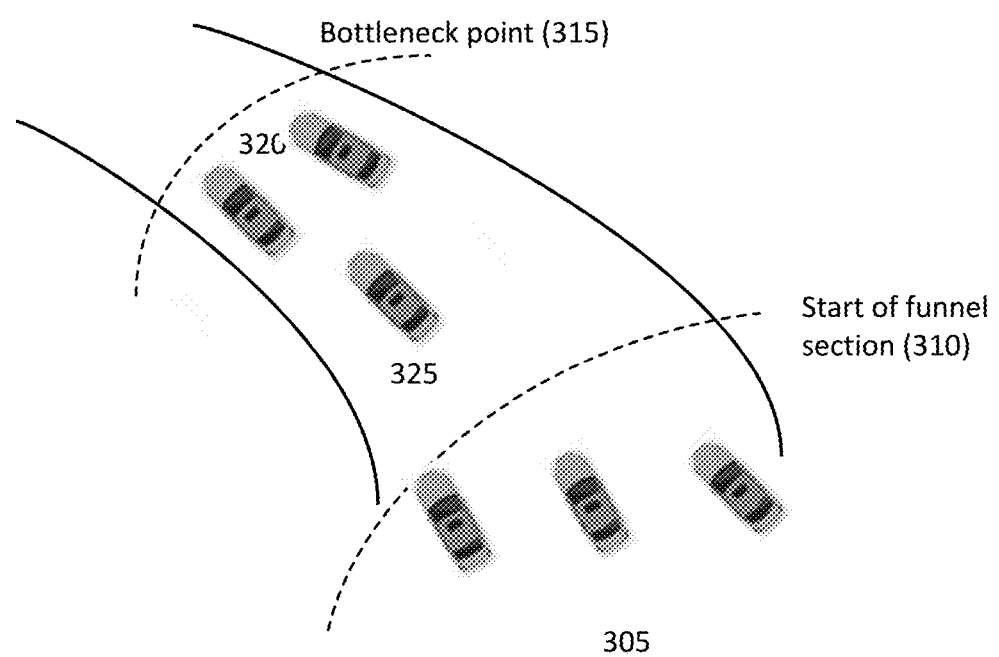

FIG. 3a shows an example (301) of a funnel section and a bottleneck point at the first turn of a racing course. Three cars (305) are side-by-side with each other, laterally, at the start of a funnel section (310) before they enter the first turn (bottleneck point 315) of the racing course. Only two cars (320) can fit through the bottleneck (315) at a time without a collision, due to the layout of the racing course at the bottleneck point (315). When the cars (305) pass the start of the funnel section (310), the AI behavior engine (120/185) of the client system(s) chooses one of the computer-controlled AI cars (325), based on algorithms and criteria that are introduced in later sections. At that point, for example, the AI behavior engine (120/185) can switch the driving mode of the selected computer-controlled AI car (325) into a trailing mode to follow the other two cars (320), in order to pass through the bottleneck point (315) without any collision.

This approach to controlling behavior in a funnel section applies not only to the first turn of a racing course, but also more generally to bottleneck points where there are too many cars in a designated section ahead of the bottleneck, and it is impossible for all the cars to flow through simultaneously at their present speed or without changing driving pattern.

For example, as shown in the examples (302) of FIG. 3b, a funnel section may be created due to the layout of the race course. In the examples (302) of FIG. 3b, the course narrows at bottleneck points in otherwise straight sections of the course.

Figure 3C:
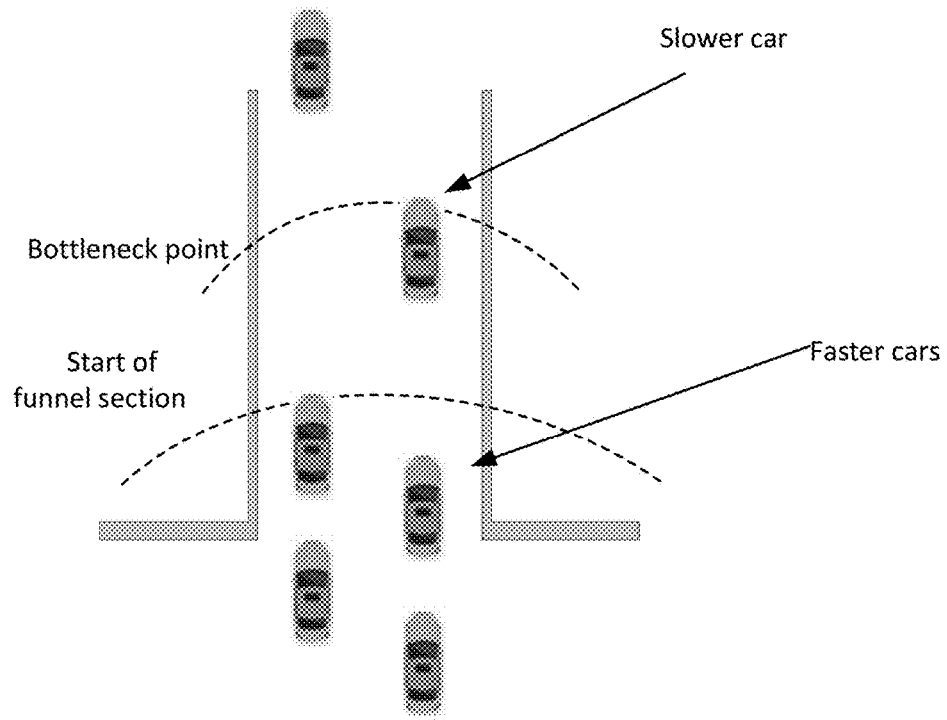

Or, as shown in the example (303) of FIG. 3c, a bottleneck point may occur due to bunching of cars. In FIG. 3c, a group of four fast cars is bunched behind a slower car at a narrow part of the course. Cars may bunch together, for example, to benefit from drafting (also called slipstreaming, which improves fuel efficiency by reducing drag) or, at least in the context of self-driving cars, to improve overall throughput during busy periods by achieving a configuration that is more compact (denser). In any case, bunching of cars exacerbates the risk of collisions at a bottleneck point.

Figure 3D:
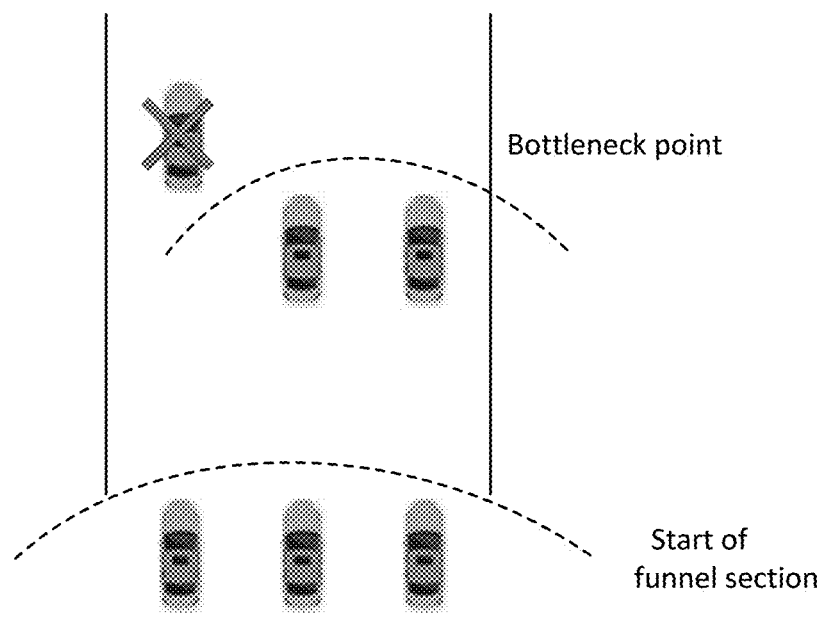

Or, as shown in the example (304) of FIG. 3d, a funnel section can be automatically created on the course due to a bottleneck caused by a dynamic condition (e.g., disabled car, crash site, another obstacle on the course, traffic/congestion, or another condition on part of the course). For example, the funnel section is dynamically placed on the course by a gaming engine (110/175) in response to detection of an obstacle (e.g., crash, debris) or condition (e.g., congestion) on the course. Such a funnel section can be automatically removed from the course by the gaming engine (110/175) when the dynamic condition is resolved. Dynamic imposition/removal of a funnel section can be implemented, for example, using a warning system about hazards on the course.

There can be multiple bottleneck points (preceded by funnel sections) on a race course. The approaches described herein can be applied to reduce collisions at bottleneck points (preceded by funnel sections) other than the first turn of a racing course at the start of a race. For example, these approaches can be applied upon resumption of normal racing conditions after a caution/yellow flag before the first turn (not the start of a race). Or, as another example, the approaches can be applied for another bottleneck (e.g., chicane) in a race course (not the first turn), due to the layout of a race course or due to bunching of cars. Or, as another example, the approaches described herein can be applied to a bottleneck created by a dynamic condition, in which case a funnel section is automatically created on the course ahead of the new bottleneck and automatically removed from the course when the dynamic condition is fixed. The start and end of a funnel section can be adjusted by the AI behavior engine based on user behavior and/or trial-and-error evaluation during operation.

III. Example Approaches for Controlling the Behavior of a Computer-Controlled AI Entity in a Funnel Section.

FIG. 4 illustrates a generalized approach (400) for controlling a computer-controlled AI entity (e.g., car) when it enters a funnel section (400). The approach (400) can be implemented by an AI behavior engine running on one or more processing units of a local or remote client gaming system, as described with reference to FIG. 1a or 1b. Or, the approach (400) can be implemented by an AI behavior engine running on one or more processing units of a server system, as described with reference to FIG. 1b.

In some example implementations, there are multiple operational driving modes for computer-controlled AI cars during a racing game. For example, the multiple operational driving modes can include a "passing mode" when a car accelerates and passes other cars to achieve a better position in the racing. Or, as another example, the multiple operational driving modes can include a "follow" mode when a car follows one or more other cars in terms of moving path and/or speed. The multiple operational driving modes can include various other modes.

According to the generalized approach (400) shown in FIG. 4, a computer system (e.g., client gaming system, server system) controls the behavior of a computer-controlled AI entity. In most cases, the behavior of the computer-controlled AI entity is modified to follow another entity, which can be a computer-controlled AI entity or user-controlled entity. That is, the behavior of the entity that is followed can be controlled by an AI behavior engine or controlled in response to user input. Each entity can be a car, motorcycle, bicycle, ski racer, robot, or other entity in a computer-represented environment. More generally, each entity can represent a real-world entity in the computer-represented environment or represent a virtual entity in a computer-represented environment.

The AI behavior engine has various settings (e.g., thresholds, weights, preferences, rules, penalties/benefits for a scoring function, locations of funnel sections) that it uses when controlling the behavior of a computer-controlled AI entity. Some examples of settings are described in this section and in other sections. A given setting can be pre-defined. Or, a given setting can be learned by the AI behavior engine from user behavior and/or trial-and-error evaluation during operation. In this context, the "user behavior" considered by the AI behavior engine can be the behavior of a local user of the system that hosts the AI behavior engine, which can be used to adjust settings for computer-controlled AI entities that interact with the local user. Or, the "user behavior" can be the behavior of another user, which can be used to adjust settings for computer-controlled AI entities that interact with the local user or used to emulate the behavior of that other user with one of the computer-controlled AI entities.

When a computer-controlled AI entity ("first entity") enters a funnel section (405), the system determines through the AI behavior engine if it should switch the first entity's behavior (410). For example, when determining to change the behavior of the first entity, the system can detect entry of the first entity into a designated part of the funnel section (such as the start of the funnel section, or all of the funnel section), then determine a count of entities in the designated part. The system can compare the count to a threshold. If the system determines that the count satisfies the threshold, the system can determine to change the behavior of the first entity. In this way, the system can selectively modify the behavior of the first entity depending on how "crowded" the designated part of the funnel section is. Section IV includes details about this approach in some example implementations. Alternatively, the system can determine when to change the behavior of the first entity in some other way.

When the system (e.g., AI behavior engine) determines it is necessary to change the behavior of the computer-controlled AI entity (e.g., in order to reduce collision chances in the bottleneck area), it selects another entity ("second entity") for the computer-controlled AI entity (first entity) to follow (415). The system can make this selection based on various criteria or scoring functions. For example, to select the second entity, the system sets a scoring function that ranks each of multiple different candidate moving paths. According to the scoring function, the system can determine a score value for each of the different candidate moving paths based on (a) a penalty for an obstacle (e.g., car, debris, wall), which may vary depending on the outcome expected in case of contact with the obstacle; (b) a penalty for deviation from an optimal moving path as determined by another component for the first entity; (c) a penalty for deviation from a moving path that the first entity currently follows, which may vary depending on the extent of deviation from the current moving path; (d) a benefit for following a candidate entity in a compact configuration (having a spacing between entities that is less than a predefined threshold distance), which can account for improved fuel efficiency from drafting and/or higher overall throughput during a high-traffic period; (e) a benefit for following a candidate entity ahead of the first entity, so as to favor selection of a second entity ahead of the first entity; (f) a penalty selection of an entity that another entity has selected to follow, as indicated by a report from that other entity, if the other entity is in a better position to follow the second entity; (g) a benefit for following a candidate entity closest to the first entity laterally, as opposed to candidate entities further away from the first entity; and/or (h) another factor. Then, the system selects one of the different candidate moving paths that has a best score. Section V includes details about this approach in some example implementations. Alternatively, the system can select the entity for the first entity to follow in some other way.

The AI behavior engine also decides how to follow the selected second entity in the funnel section (420). In practice, some aspects of this decision can be made concurrently with the selection of the entity to follow. For example, when determining how to follow the second entity, the system can match a moving path of the second entity and match the speed of the second entity. Alternatively, the system can decide how to follow the selected second entity in some other way.

Finally, based at least in part on results of the determining (420) how to follow the second entity, the AI behavior engine sets control values for the behavior of the computer-controlled AI entity (first entity) (425). In this way, the first entity can follow the selected second entity in the funnel section.

In example implementations in which the first entity has an operational mode selected from among multiple available driving modes, to change the behavior of the first entity, the system can change (as a control value) the operational mode to a trailing mode configuration, so that the first entity follows the second entity into the funnel section. The trailing mode configuration can be implemented by switching to a "follow" mode (as a control value) or by otherwise adjusting the behavior of the computer-controlled AI entity through values set for other parameters. For example, at a lower level, the system can set control values to change the position, orientation, vector, and/or other attributes of the first entity. After the first entity passes through the funnel section, the system can change the operational mode back to one of the multiple available driving modes other than the trailing mode (or otherwise adjust control values).

When the system that implements the approach (400) shown in FIG. 4 is a local client gaming system that participates in a networked, multi-player gaming scenario, the local client gaming system can perform other operations. For example, the local client gaming system sends updates (indicating the control value(s) for the behavior of the first entity) to a server system. Or, for updates exchanged to and from the local client gaming system), the local client gaming system can receive first updates (indicating control values for one or more other entities whose behavior is not controlled at the local client gaming system) from a server system and send second updates (indicating control values for one or more entities, such as the first entity, whose behavior is controlled at the local client system) to the server system.

On the other hand, when the system that implements the approach (400) shown in FIG. 4 is a server system that participates in a networked, multi-player gaming scenario, the server system can perform other operations. For example, the system (server system) sends updates (indicating the one or more control values for the behavior of the first entity) to one or more local client systems. For each of the local client system(s), the server system can determine a level of detail suitable for the updates.

Operations shown in FIG. 4 can be repeated iteratively to control the behavior of the first entity over time. For example, with an AI behavior engine, the system can iteratively repeat the operations of selection of another entity to follow (415) and the decision how to follow the selected other entity (420) in a funnel section. Or, as another example, with an AI behavior engine, the system can iteratively repeat all the operations shown in FIG. 4, also checking if the first entity is still in the funnel section and that the funnel section is still crowded enough to warrant switching behavior. Thus, the operations shown in FIG. 4 can be performed as part of an iteration of a loop. In each of one or more additional iterations, the system can repeat the determining (410) to change the behavior of the first entity, the selecting (415) the second entity, the determining (420) how to follow, and the setting (425) the control value(s) for the behavior of the first entity. The selected second entity can be different in different iterations of the loop. Similarly, the control values that are set can be different in different iterations of the loop. Settings of the AI behavior engine can be adjusted between iterations of the loop.

Operations can be repeated at the frame rate for rendering (e.g., 60 fps). Or, operations can be repeated every x frames, where x is 2, 3, 4, or some other count of frames rendered by the system. In any case, the problematic configuration in the funnel section ahead of a bottleneck is not immediately resolved. Rather, the problematic configuration is resolved by entities (e.g., cars) re-organizing themselves over some period of time (e.g., 1-3 seconds) or distance (e.g., 100-300 meters) through the funnel section. Typically, a problematic configuration in the funnel section collapses into an appropriate racing configuration through a sequence of minor adjustments towards the appropriate racing configuration within the funnel section.

With its AI behavior engine, a gaming system (client gaming system or server system) can make decisions about behavior independently for each computer-controlled AI entity. Thus, for each of one or more other entities whose behavior is controlled by the AI behavior engine of the system, the system can iteratively repeat the operations of the approach (400) in FIG. 4—repeating the determining (410) to change the behavior of the given entity, the selecting (415) another entity to follow, the determining (420) how to follow that other entity, and the setting (425) the control value(s) of the given entity. Settings of the AI behavior engine can be the same for different entities whose behavior is controlled by the AI behavior engine. Or, for increased customization of behavior, settings of the AI behavior engine can vary for different entities whose behavior is controlled by the AI behavior engine. Information about decisions made for the respective computer-controlled AI entities can be shared to the multiple AI behavior engines across the multiple gaming devices in the network through the server. Such information can be used to enforce constraints that multiple computer-controlled AI entities not pick the same entity to follow, and that multiple computer-controlled AI entities not try to follow each other. Using such information can help the AI behavior engine avoid inconsistent states and rapidly switching (thrashing) between decision states.

Once the AI behavior engine determines that conditions have changed such that there is no need to continue switching an entity's behavior to a funnel section configuration, e.g., the funnel section or the bottleneck is no longer crowded, the "trailing mode" behavior can be stopped. At this point, the computer-controlled AI entities can switch to other modes, e.g., a regular driving mode.

IV. Example Implementations for Determining Switching to Funnel Section Behavior.

Figure 5:
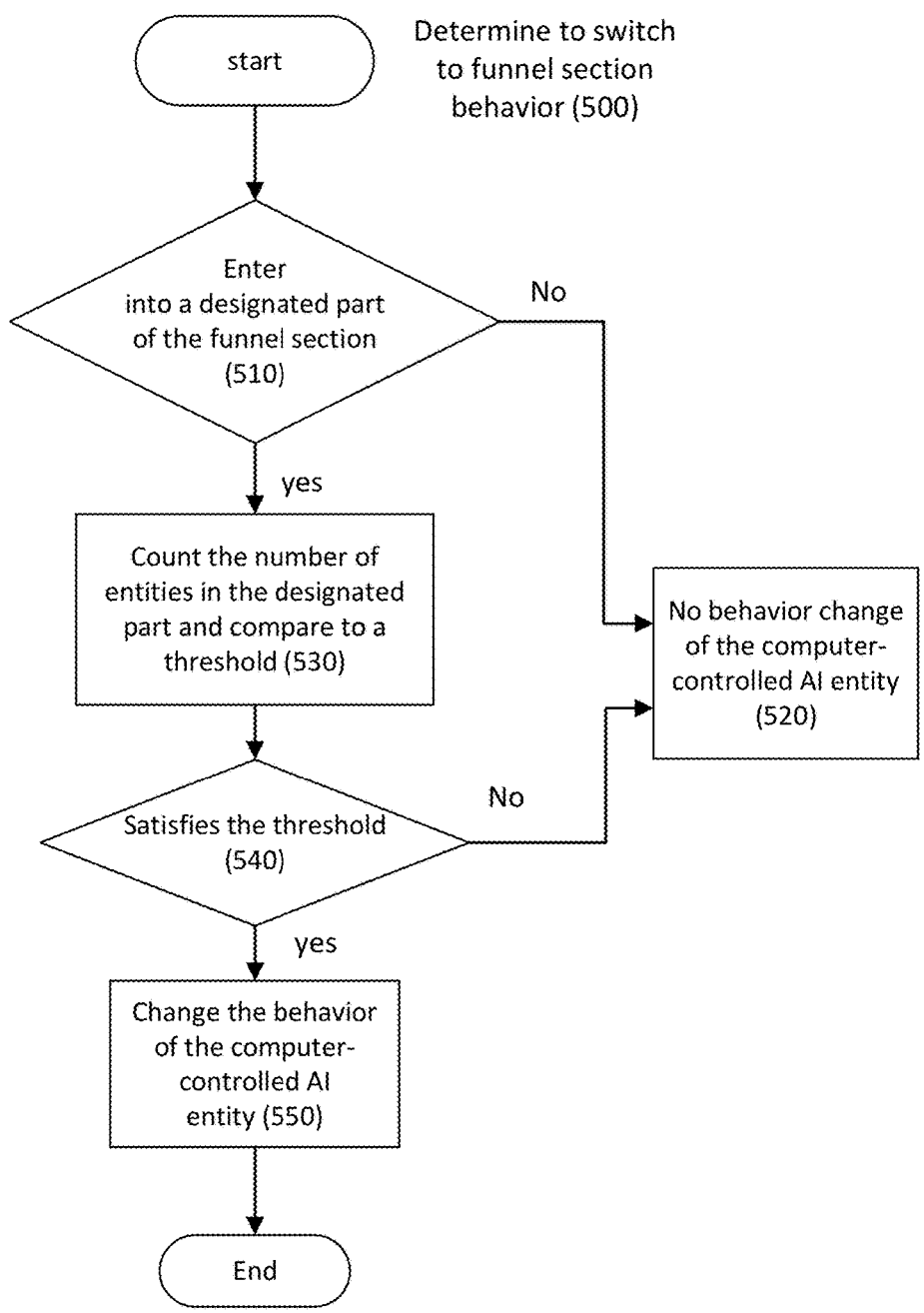
FIG. 5 is a flowchart illustrating an example technique for controlling the behavior of a computer-controlled AI entity in a funnel section.

FIG. 5 is a flowchart of an example (500) of operations performed when determining whether to switch to funnel section behavior. The example operations (500) can be performed, at least in part, by an AI behavior engine, such as the AI behavior engine (120/185) described with reference to FIG. 1a or 1b. Overall, the AI behavior engine of the system monitors positions of entities on the racing course. It can selectively switch to funnel section behavior at the first turn of a race course or other bottleneck on the course.

At 510, the AI behavior engine determines whether a given computer-controlled AI entity has entered a designated part of a funnel section ahead of the bottleneck. The designated part of the funnel section can be, for example, the entire funnel section, or an initial portion of the funnel section. The designated part of the funnel section is where the AI behavior engine can first check if the given computer-controlled AI entity should switch to funnel section behavior ahead of a bottleneck. The end of the funnel section can precede the bottleneck, or the funnel section can overlap the bottleneck to some extent. The start of the funnel section and/or end of the funnel section can be predefined or be adjusted during operation. If the computer-controlled AI entity is not in a designated part of the funnel section, the AI behavior engine does not apply any change to the behavior of the computer-controlled AI entity (520).

At 530, if the given computer-controlled AI entity is in the designated part of the funnel section, the AI behavior engine counts the number of entities in the designated part of the funnel section and compares it to a threshold. The threshold depends on implementation. It can be predetermined and set in the game system by a game designer, or it can be set by the AI behavior engine based on collected data during the game, or it can be set by the game system based on other machine learning algorithms for the racing game, or otherwise learned from user behavior or trial-and-error evaluation of different values for the threshold. In general, the threshold indicates a count of entities in the funnel section that signifies there are "too many" entities in the funnel section to pass through the bottleneck without collision, unless the entities are reorganized into a different configuration.

At 540, if the counted number satisfies the threshold (e.g., is greater than the threshold, is greater than or equal to the threshold), the AI behavior engine determines that the computer-controlled AI entity in the funnel section should change its behavior in the funnel section (550) (e.g., enter the trailing mode configuration). On the other hand, if the condition is not satisfied, the AI behavior engine does not apply any change to the computer-controlled AI entity (520).

By selectively applying these operations (500) to the various computer-controlled AI entities in the funnel section, the AI behavior engine can adjust the behavior of the entities in the funnel section, causing the entities to reorganize themselves if a threshold count of entities is present in the funnel section.

Alternatively, in a different implementation, the AI behavior engine checks how crowded the area is immediately around the given computer-controlled AI entity. For example, the AI behavior engine checks if there is a threshold count of entities around the given computer-controlled AI entity laterally (to the left and to the right of the given computer-controlled AI entity). The threshold count depends on implementation and can be set like the threshold described with respect to stage 530. If the bottleneck is wide enough for N entities, and there is a line of N+1 or more entities (including the given computer-controlled AI entity) in the funnel section, the AI behavior engine determines to switch to funnel section behavior for the given computer-controlled AI entity.

Or, in another different implementation, the AI behavior engine gets update information about funnel sections created due to dynamic conditions such as a disabled entity, crash site, or other obstacle on the course. This update information may come from other components in the gaming system, such as the one or more processors (125) described with reference to FIG. 1 (for local play scenario or multi-player online play scenario), or from the server (for multi-player online play scenario). The AI behavior engine automatically adjusts the threshold accordingly, and compares the counted entity number with the adjusted threshold. The AI behavior engine then determines if it is necessary to switch to funnel section behavior for the given computer-controlled AI entity.

V. Example Implementations for Selecting which Entity to Follow.

After the given computer-controlled AI entity switches to funnel section behavior, the AI behavior engine selects which entity, if any, the given computer-controlled AI entity should follow into the bottleneck.

If there is no candidate entity in front of the given computer-controlled AI entity within a threshold distance (e.g., because all other entities in the funnel section are behind the given computer-controlled AI entity, and the next closest entity in front of the given computer-controlled AI entity is far away), the given computer-controlled AI entity need not pick any other entity to follow. The threshold distance depends on implementation. It can be predetermined and set in the game system by a game designer, or it can be set by the AI behavior engine based on collected data during the game, such as the current speed and direction of the given computer-controlled AI entity and the nearest entity in front of it, or otherwise learned from user behavior or trial-and-error evaluation of different values for the threshold distance. Otherwise, the AI behavior engine selects a candidate entity for the given computer-controlled AI entity to consider based on various factors. The decision can be biased in various ways. For example:

- The decision can be biased to pick a candidate entity that is linearly ahead of the given computer-controlled AI entity (rather than a candidate entity to the side of the given computer-controlled AI entity). This favors an aggressive selection for the given computer-controlled AI entity.
- If a candidate entity to the side of the given computer-controlled AI entity is picked, the decision can be biased to select a candidate entity closer to the given computer-controlled AI entity (side to side). This favors a less disruptive selection for the given computer-controlled AI entity.
- Similarly, the decision can be biased to select a candidate entity closest to the given computer-controlled AI entity (side to side) unless there is a candidate entity ahead of the given computer-controlled AI entity which can be followed by the given computer-controlled AI entity and reached by the given computer-controlled AI entity before some other entity reaches it.
- The decision can be biased to avoid selecting a candidate entity that another computer-controlled AI entity has selected. Computer-controlled AI entities can report which candidate entities they have selected for funnel section behavior.
- The decision can also be biased to avoid selecting a candidate entity that a user-controlled entity is following.
- Alternatively, the decision can be biased to avoid selecting a candidate entity that another entity will likely follow (e.g., without feedback about selections, but depending on proximity of the candidate entity to other entities).

Alternatively, the decision can be biased in some other way. Settings of the AI behavior engine can include weights, scoring function penalties, scoring function benefits, etc. that regulate the desirability of factors that affect the selection of a candidate entity to follow. The weights, penalties, benefits, etc. can be predetermined and set in the game system by a game designer, or they can be set by the AI behavior engine based on collected data during the game, such as whether favoring a factor results in a collision, or otherwise learned from user behavior or trial-and-error evaluation of different values for the weights, penalties, benefits, etc.

In real-life racing, there are rules about when to yield to another car. These rules can be also implemented in the AI behavior engine in the decision-making process.

In some implementations, the AI behavior engine uses a scoring function to select which candidate entity to follow. FIG. 6 illustrates an example (600) of how a scoring function can assign a score to different candidate entities. The horizontal axis is divided into multiple regions, where each region represents a potential path that the given computer-controlled AI entity can choose to follow in the funnel section. The multiple candidate entities to follow are also distributed in the multiple regions. The scoring function then provides a score for each of the paths. The score assigned to a candidate entity in one of the paths is the score that accumulates the penalties and/or benefits associated with that path. The score can incorporate factors described above (e.g., proximity to candidate entity in front, proximity to candidate entity to the side). The penalty/benefit can be different for different candidate entities (e.g., a larger benefit/smaller penalty for a candidate entity ahead of the given computer-controlled AI entity, and a smaller benefit/larger penalty for a candidate entity to the side of the given computer-controlled AI entity). The benefit can be adjusted depending on proximity to other entities (e.g., decreasing the benefit for a candidate entity that is closer to another entity that may follow it, compared to the given computer-controlled AI entity).

Once the AI behavior engine switches a computer-controlled AI entity to funnel section behavior, the AI behavior engine ranks the scores of different candidate entities. The AI behavior engine chooses one of the candidate entities with the best score for the computer-controlled AI entity to follow in the funnel section.

In FIG. 6, the horizontal axis of the funnel section is divided into seven regions that represent seven different options of paths for the given computer-controlled AI entity to choose from. In the example (600) of FIG. 6, the best score is the lowest score. The scoring function then adds penalties and/or subtracts benefits to each of the paths. The path that the given computer-controlled AI entity currently follows is called the current path. In one example, a penalty (605) is added to the score of a given candidate path when the given path deviates from the current path. The added penalty increases as the given path further deviates from the current path. As a different example, a penalty (610) is added to the score of a candidate path if there is an obstacle in that candidate path. In another example, a penalty (615) is added to the score of a candidate path if there is a candidate entity in the path and it has been followed by another computer-controlled AI entity. FIG. 6 also illustrates an example of a benefit score for the seven paths. A benefit (620) is subtracted for the current path if a candidate entity is in the current path and is linearly ahead of the given computer-controlled AI entity. (This is shown in FIG. 6 as part of the penalty (610) being removed.) In a different example (not shown in FIG. 6 due to showing of the above benefit), if there is no candidate entity in the current path, a benefit is subtracted to a candidate path with a candidate entity that is laterally closest to the given computer-controlled AI entity (side by side). After considering all the penalties and benefits in the scoring function, the AI behavior engine chooses the path with the best score (the least score in the scoring function shown in FIG. 6) to follow.

The above operations can be repeated iteratively for a given computer-controlled AI entity over time (e.g., for different frames, different decisions). For example, the AI behavior engine iteratively repeats the operations of selection of another entity to follow, and chooses one of the candidate entities that has the best current score to follow.

VI. Example Implementations for Deciding How to Follow Selected Entity.

The AI behavior engine can determine (1) which racing path for the given computer-controlled AI entity to follow behind the selected entity, and (2) which speed to use for the given computer-controlled AI entity.

In some implementations, the racing path of the given computer-controlled AI entity will generally align with the racing path of the entity that is followed.

In different implementations, a scoring function is used to indicate which racing path to follow. The scoring function provides a score (cost) for each of multiple candidate racing paths. For a racing path, the score accumulates the penalties and/or benefits associated with that racing path. That is, for a given racing path, penalties and/or benefits stack. For example, these can include:

a penalty for deviating from the current racing path of the given computer-controlled AI entity;

a penalty for deviating from the optimal racing path (or benefit for moving towards the optimal racing path) for the given computer-controlled AI entity;

a penalty for an obstacle (such as a wall) or road hazard;

a penalty for colliding with another entity (or benefit for following another entity in a compact configuration); and/or another penalty or benefit.

Settings of the AI behavior engine can include scoring function penalties, scoring function benefits, etc. that regulate the selection of which racing path to follow. The penalties, benefits, etc. can be predetermined and set in the game system by a game designer, or they can be set by the AI behavior engine based on collected data during the game, such as whether a value for a penalty/benefit results in a collision, or otherwise learned from user behavior or trial-and-error evaluation of different values for the penalties, benefits, etc.

The scoring function can also incorporate a preference to stay away from user-controlled entities (e.g., penalty that increases closer to a user-controlled entity). This tends to create a "buffer zone" around a user-controlled entity, which tends to make the behavior of the computer-controlled AI entity less realistic but may improve the racing experience for human players. The extent of the penalty (and resulting buffer zone) can be tuned depending on implementation or user preferences.

These operations can be repeated iteratively for a given computer-controlled AI entity over time (e.g., for different frames, different decisions). For example, the AI behavior engine can iteratively repeat the operations of making decision how to follow the selected other entity in a funnel section.

A scoring function can concurrently indicate which candidate entity the given computer-controlled AI entity should follow and which racing path the given computer-controlled AI entity should adopt. For example, the scoring function incorporates a benefit for following a candidate entity, as described above.

The speed of the given computer-controlled AI entity will generally be set to catch up to the entity that is followed. The speed control can follow rules such as:

(1) If the selected entity (to follow) is accelerating, do not brake; accelerating or coasting is allowed.

(2) If the selected entity (to follow) is braking, do not accelerate; braking or coasting is allowed.

(3) Otherwise, narrow the distance between the given computer-controlled AI entity and selected entity (to follow) in order to draft or otherwise benefit from achieving a more compact configuration (that is, a configuration having a spacing between entities that is less than a predefined threshold distance), and then match speed of the selected entity (to follow).

Alternatively, the speed control follows another rule. Settings of the AI behavior engine can include rules, a threshold distance, etc. that regulate the speed control. The rules, threshold distance, etc. can be predetermined and set in the game system by a game designer, or they can be set by the AI behavior engine based on collected data during the game, such as whether following a rule results in a collision, or otherwise learned from user behavior or trial-and-error evaluation of different rules, threshold distances, etc.

VII. Settings.

There can be an on/off switch exposed to a user for controlling behavior at a funnel section. In this case, the system can check the on/off switch for controlling funnel section behavior and perform operations (such as the operations for the approach (400) shown in FIG. 4) contingent on the value of the on/off switch.

Other settings (e.g., for behavior of computer-controlled AI entities) might also be exposed to the user. The settings exposed to the user can include high-level decisions or low-level thresholds, weights, preferences, rules, penalties/benefits for a scoring function, etc. as described in other sections.

For a game developer, there can be an on/off switch in a development environment for controlling funnel section behavior of computer-controlled AI entities. Also, the developer can set the position of a funnel section and/or set settings that control behavior of computer-controlled AI entities in the funnel section. These settings can be set as part of a game engine, platform or development environment. The settings exposed to the game developer can include high-level decisions or low-level thresholds, weights, preferences, rules, penalties/benefits for a scoring function, etc. as described in other sections.

There can be an on/off switch to enable incorporation of personalized avatar characteristics into funnel section behavior. For example, penalties or benefits of a scoring function used to select an entity to follow and/or select a racing path, or other settings, can reflect a preference to pass (or not pass) in a narrow area or reflect an extent of aversion to obstacles, road hazards, etc. The personal avatar characteristics can be set according to input from a user associated with the avatar behavior and/or learned from the behavior of the user associated with the avatar behavior.

VIII. Alternative Use Case Scenarios.

Many of the preceding examples relate to controlling behavior of the computer-controlled AI cars on a race course. The technical solutions described herein can be used in various other scenarios, including, Motorcycle racing, boat racing, or racing of other vehicles;

Ski racing or other human racing;

Self-driving cars, autonomous cars or robotic cars; and

Control of autonomous equipment (e.g., robots) in a warehouse.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing computer-executable instructions for causing one or more processing units, when programmed thereby, to perform operations to control behavior of a first virtual entity in a computer-represented environment, the behavior of the first virtual entity being controlled by an artificial intelligence ("AI") behavior engine executable on the one or more processing units, the AI behavior engine being part of a gaming system, the operations comprising:

determining to change the behavior of the first virtual entity for a funnel section in the computer-represented environment, the funnel section being part of a racing course in a racing game; and as part of switching to funnel section behavior in response to the determining to change the behavior of the first virtual entity for the funnel section in the computer-represented environment:
  selecting a second virtual entity for the first virtual entity to follow in the funnel section;
  determining how to follow the second virtual entity; and
  updating game information for the racing game, including setting one or more control values for the behavior of the first virtual entity based at least in part on results of the determining how to follow the second virtual entity.

2. The one or more computer-readable media of claim 1, wherein:
  the first virtual entity and the second virtual entity are each selected from the group consisting of car, motorcycle, bicycle, boat, ski racer, and robot;
  behavior of the second virtual entity is controlled by the AI behavior engine or controlled in response to user input.

3. The one or more computer-readable media of claim 1, wherein the racing course is annotated to designate a section ahead of the funnel section.

4. The one or more computer-readable media of claim 1, wherein the funnel section is dynamically placed on the racing course in response to detection of an obstacle or congestion on the racing course.

5. The one or more computer-readable media of claim 1, wherein the determining to change the behavior of the first virtual entity includes:
  detecting entry of the first virtual entity into a designated part of the funnel section;
  determining a count of virtual entities in the designated part;
  comparing the count to a threshold; and
  determining that the count satisfies the threshold.

6. The one or more computer-readable media of claim 1, wherein the first virtual entity has an operational mode selected from among multiple available driving modes, and wherein, to change the behavior of the first virtual entity, the operational mode is changed to a trailing mode so as to follow the second virtual entity into the funnel section.

7. The one or more computer-readable media of claim 1, wherein the AI behavior engine controls the behavior of the first virtual entity based at least in part on settings, each of the settings being (a) predefined or (b) learned from user behavior and/or trial-and-error evaluation during operation.

8. The one or more computer-readable media of claim 1, wherein the selecting the second virtual entity includes:
  setting a scoring function that ranks each of multiple different candidate moving paths; and
  selecting one of the multiple different candidate moving paths that has a best score.

9. The one or more computer-readable media of claim 8, wherein the scoring function sets a score value for each of the multiple different candidate moving paths based on one or more of:
  a penalty for an obstacle;
  a penalty for deviation from an optimal moving path;
  a penalty for deviation from a moving path that the first virtual entity currently follows;
  a benefit for following a candidate virtual entity in a compact configuration;
  a benefit for following a candidate virtual entity ahead of the first virtual entity;
  a penalty for selection of a virtual entity that another virtual entity has selected to follow; and
  a benefit for following a candidate virtual entity closest to the first virtual entity laterally.

10. The one or more computer-readable media of claim 1, wherein the determining how to follow the second virtual entity includes:
  matching a moving path of the second virtual entity; and
  matching speed of the second virtual entity.

11. The one or more computer-readable media of claim 1, wherein the one or more processing units are part of a server system for the gaming system, and wherein the operations further comprise:
  sending updates to one or more local client systems, wherein the updates indicate the one or more control values for the behavior of the first virtual entity.

12. The one or more computer-readable media of claim 11, wherein the operations further comprise:
  for each of the one or more local client systems, determining a level of detail suitable for the updates.

13. The one or more computer-readable media of claim 1, wherein the one or more processing units are part of a local client system for the gaming system, and wherein the operations further comprise:
  sending updates to a server system for the gaming system, wherein the updates indicate the one or more control values for the behavior of the first virtual entity.

14. The one or more computer-readable media of claim 1, wherein the one or more processing units are part of a local client system for the gaming system, and wherein the operations further comprise:
  receiving first updates, from a server system for the gaming system, wherein the first updates indicate control values for one or more other virtual entities whose behavior is not controlled at the local client system; and
  sending second updates, to the server system, wherein the second updates indicate control values for one or more virtual entities whose behavior is controlled at the local client system, the one or more virtual entities whose behavior is controlled at the local client system including the first virtual entity.

15. The one or more computer-readable media of claim 1, wherein the operations are performed are performed as part of an iteration of a loop, and wherein the operations further comprise repeating, in one or more additional iterations of the loop, the determining to change the behavior, the selecting the second virtual entity, the determining how to follow, and the updating the game information.

16. The one or more computer-readable media of claim 15, wherein the second virtual entity is different in different iterations of the loop.

17. The one or more computer-readable media of claim 1, wherein the operations further comprise:
  checking an on/off setting for controlling the funnel section behavior, wherein the determining to change the behavior, the selecting the second virtual entity, the determining how to follow, and the updating the game information are contingent on value of the on/off setting.

18. The one or more computer-readable media of claim 1, wherein the operations further comprise, for each of one or more other virtual entities whose behavior is controlled by the AI behavior engine:

repeating the determining to change the behavior, the selecting, the determining how to follow, and the updating the game information.

19. In a computer system that includes one or more processing units, a method for controlling behavior of a first virtual entity in a computer-represented environment, the behavior of the first virtual entity being controlled by an artificial intelligence ("AI") behavior engine executable on the one or more processing units, the AI behavior engine being part of a gaming system, the method comprising:
determining to change the behavior of the first virtual entity for a funnel section in the computer-represented environment, the funnel section being part of a racing course in a racing game; and
as part of switching to funnel section behavior in response to the determining to change the behavior of the first virtual entity for the funnel section in the computer-represented environment:
selecting a second virtual entity for the first virtual entity to follow in the funnel section;
determining how to follow the second virtual entity; and
updating game information for the racing game, including setting one or more control values for the behavior of the first virtual entity based at least in part on results of the determining how to follow the second virtual entity.

20. A computer system comprising one or more processing units and memory storing computer-executable instructions for an artificial intelligence ("AI") behavior engine executable on the one or more processing units to perform operations for controlling behavior of a first virtual entity in a computer-represented environment, the AI behavior engine being part of a gaming system, the operations comprising:
determining to change the behavior of the first virtual entity for a funnel section in the computer-represented environment, the funnel section being part of a racing course in a racing game; and
as part of switching to funnel section behavior in response to the determining to change the behavior of the first virtual entity for the funnel section in the computer-represented environment:
selecting a second virtual entity for the first virtual entity to follow in the funnel section;
determining how to follow the second virtual entity; and
updating game information for the racing game, including setting one or more control values for the behavior of the first virtual entity based at least in part on results of the determining how to follow the second virtual entity.

21. The computer system of claim 20, wherein the determining to change the behavior of the first virtual entity includes:
detecting entry of the first virtual entity into a designated part of the funnel section;
determining a count of virtual entities in the designated part;
comparing the count to a threshold; and
determining that the count satisfies the threshold.

22. The computer system of claim 20, wherein the selecting the second virtual entity includes:
setting a scoring function that ranks each of multiple different candidate moving paths; and
selecting one of the multiple different candidate moving paths that has a best score.

23. The computer system of claim 22, wherein the scoring function sets a score value for each of the multiple different candidate moving paths based on one or more of:
a penalty for an obstacle;
a penalty for deviation from an optimal moving path;
a penalty for deviation from a moving path that the first virtual entity currently follows;
a benefit for following a candidate virtual entity in a compact configuration;
a benefit for following a candidate virtual entity ahead of the first virtual entity;
a penalty for selection of a virtual entity that another virtual entity has selected to follow; and
a benefit for following a candidate virtual entity closest to the first virtual entity laterally.

24. The computer system of claim 20, wherein the determining how to follow the second virtual entity includes:
matching a moving path of the second virtual entity; and
matching speed of the second virtual entity.

25. The computer system of claim 20, wherein the operations further comprise:
checking an on/off setting for controlling the funnel section behavior, wherein the determining to change the behavior, the selecting the second virtual entity, the determining how to follow, and the updating the game information are contingent on value of the on/off setting.

26. The method of claim 19, wherein the determining to change the behavior of the first virtual entity includes:
detecting entry of the first virtual entity into a designated part of the funnel section;
determining a count of virtual entities in the designated part;
comparing the count to a threshold; and
determining that the count satisfies the threshold.

27. The method of claim 19, wherein the selecting the second virtual entity includes:
setting a scoring function that ranks each of multiple different candidate moving paths; and
selecting one of the multiple different candidate moving paths that has a best score.

28. The method of claim 27, wherein the scoring function sets a score value for each of the multiple different candidate moving paths based on one or more of:
a penalty for an obstacle;
a penalty for deviation from an optimal moving path;
a penalty for deviation from a moving path that the first virtual entity currently follows;
a benefit for following a candidate virtual entity in a compact configuration;
a benefit for following a candidate virtual entity ahead of the first virtual entity;
a penalty for selection of a virtual entity that another virtual entity has selected to follow; and
a benefit for following a candidate virtual entity closest to the first virtual entity laterally.

29. The method of claim 19, wherein the determining how to follow the second virtual entity includes:
matching a moving path of the second virtual entity; and
matching speed of the second virtual entity.

30. The method of claim 19, further comprising:
checking an on/off setting for controlling the funnel section behavior, wherein the determining to change the behavior, the selecting the second virtual entity, the determining how to follow, and the updating the game information are contingent on value of the on/off setting.

\* \* \* \* \*